US009260066B2

(12) United States Patent
Tokunaga et al.

(10) Patent No.: US 9,260,066 B2
(45) Date of Patent: Feb. 16, 2016

(54) VEHICLE-MOUNTED NETWORK SYSTEM AND MANAGEMENT APPARATUS FOR THE SAME

(71) Applicant: DENSO CORPORATION, Kariya, Aichi-pref. (JP)

(72) Inventors: Tomoya Tokunaga, Kariya (JP); Hidetoshi Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/521,553

(22) Filed: Oct. 23, 2014

(65) Prior Publication Data

US 2015/0112510 A1    Apr. 23, 2015

(30) Foreign Application Priority Data

Oct. 23, 2013 (JP) ................... 2013-220229

(51) Int. Cl.
*G06F 1/32* (2006.01)
*B60R 16/03* (2006.01)
(52) U.S. Cl.
CPC ...................... *B60R 16/03* (2013.01)
(58) Field of Classification Search
CPC combination set(s) only.
See application file for complete search history.

(56) References Cited

U.S. PATENT DOCUMENTS

2005/0204204 A1    9/2005 Muth
2006/0075086 A1    4/2006 Muth
2011/0046844 A1*   2/2011 Honner et al. ................... 701/33
2012/0030490 A1*   2/2012 Makino et al. ................ 713/323
2015/0025704 A1    1/2015 Horihata

FOREIGN PATENT DOCUMENTS

JP    2005-529517 A    9/2005
JP    2010-161656 A    7/2010
JP    2013-192108 A    9/2013

OTHER PUBLICATIONS

Office Action mailed Aug. 18, 2015 in the corresponding JP application No. 2013-220229 (with English translation).

* cited by examiner

*Primary Examiner* — Thomas Tarcza
*Assistant Examiner* — Edward Pipala
(74) *Attorney, Agent, or Firm* — Posz Law Group, PLC; David Posz

(57) ABSTRACT

A vehicle-mounted network system includes a plurality of electronic control units (ECUs) communicatively connected to a communication path of a vehicle-mounted network, each of which is configured to selectively perform a normal mode of operation and a sleep mode, and a management apparatus. The plurality of ECUs are configured to be individually powered on and off by a power supply relay of the management apparatus. The management apparatus is configured to acquire information indicative of a vehicle situation and determine a scene from the acquired information, determine control contents for powering on or off at least one specific ECU, of the plurality of ECUs, corresponding to the determined scene, if any, and power on or off the at least one specific ECU based on the determined control contents.

5 Claims, 3 Drawing Sheets

US 9,260,066 B2

VEHICLE-MOUNTED NETWORK SYSTEM AND MANAGEMENT APPARATUS FOR THE SAME

CROSS-REFERENCE TO RELATED APPLICATION

This application is based on and claims the benefit of priority from earlier Japanese Patent Applications No. 2013-220229 filed Oct. 23, 2013, the descriptions of which are incorporated herein by reference.

BACKGROUND

1. Technical Field

The present invention relates to network management techniques for reducing power consumption of a vehicle-mounted network system.

2. Related Art

A vehicle includes a plurality of electronic control units (ECUs) for controlling devices mounted in the vehicle, where the ECUs are connected to a communication bus to form a vehicle-mounted network system. A partial networking technique for reducing power consumption of such a vehicle-mounted network system, as disclosed in Japanese Patent Application Laid-Open Publication (Translation of PCT Application) No. 2005-529517, disables some of the ECUs which are unnecessary for system control, depending on circumstances, thereby putting them in a low power consumption state (i.e., a sleep mode).

In the partial networking technique as set forth above, each of the plurality of ECUs includes a transceiver. The transceiver of each ECU has to be always on so as to receive an activation signal via the communication bus even in the sleep mode, which allows the ECU in the sleep mode to return to a normal mode of operation (i.e., a wake up mode) on receipt of the activation signal. Thus, the ECUs continue to consume some power even in the sleep mode. In addition, there is a disadvantage that use of the transceiver supporting the partial networking in each of the plurality of ECUs leads to increased power consumption during the sleep mode.

In consideration of the foregoing, it would therefore be desirable to have network management techniques for reducing power consumption of a vehicle-mounted network system.

SUMMARY

In accordance with an exemplary embodiment of the present invention, there is provided a vehicle-mounted network system including: a plurality of electronic control units (ECUs) communicatively connected to a communication path of a vehicle-mounted network, each of the ECUs being configured to selectively perform a normal mode of operation, in which the functionality of the ECU is not restricted, and a sleep mode, in which the functionality of the ECU is restricted; and a management apparatus communicatively connected to the communication path.

The management apparatus includes: a power supply relay including a plurality of switches provided along a plurality of power delivery paths, one for each of the plurality of power delivery paths, each of the power delivery paths being connected to at least one of the plurality of ECUs through a corresponding one of the switches, whereby the at least one ECU can be powered on and off by turning on and off the corresponding switch; a scene determination unit configured to acquire information indicative of a vehicle situation and determine a scene from the acquired information; a control content determination unit configured to determine control contents for powering on or off at least one specific ECU, of the plurality of ECUs, corresponding to the scene determined by the scene determination unit, if any; and a control unit configured to power on or off the at least one specific ECU by using the power supply relay based on the control contents determined by the control content determination unit.

With this configuration, the management apparatus determines, for each of the ECUs, whether or not the ECU needs to be supplied with power and whether or not the ECU is allowed to transition to the sleep mode based on the scene specified as a function of the vehicle situation and then powers on/off the ECU and/or causes the ECU to transition to the sleep mode. That is, powering off the ECUs that are not used in a specific scene can eliminate power consumption of these ECUs. This can reduce standby power of the ECUs that are not involved in controlling the devices used in the scene, thereby reducing power consumption of the whole system. The powered-off ECUs are allowed to be powered on in such a scene that the powered-off ECUs need to be activated, which allows all the ECUs that need to be involved in controlling the devices used in the scene to operate, thereby maintaining functionality of the system.

In addition, the ECUs that are not used at all in controlling the devices used in a specific scene are configured to be powered off. The ECUs that have to return to the normal mode of operation immediately in another specific scene may be left in the sleep mode without being powered off. With this configuration, use of the power delivery control and the sleep mode in the partial networking allows enhancing power savings and maintaining functionality to be compatible with each other.

DESCRIPTION OF SPECIFIC EMBODIMENTS

The present invention will be described more fully hereinafter with reference to the accompanying drawings.

[System Configuration]

Figure 1A:
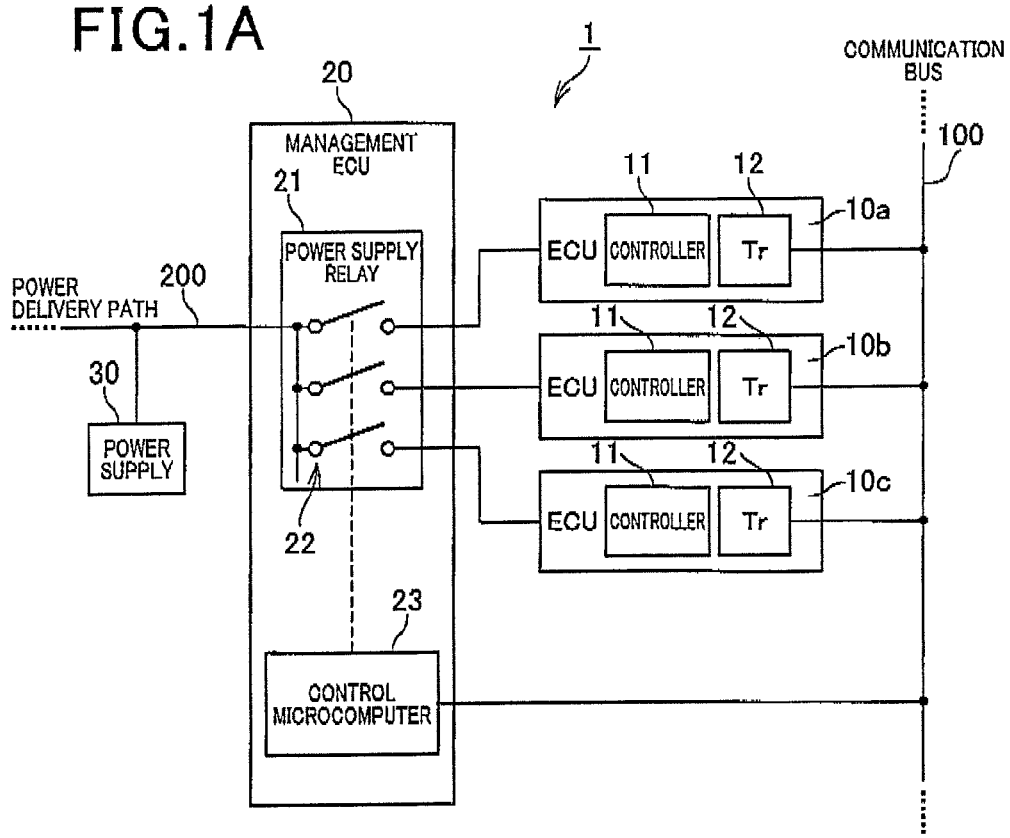
FIG. 1A is schematic block diagram of a vehicle-mounted network system in accordance with one embodiment of the present invention.

FIG. 1A shows a schematic block diagram of a vehicle-mounted network system 1 in accordance with one embodiment of the present invention. As shown in FIG. 1A, the vehicle-mounted network system 1 includes a management ECU 20 (as a management apparatus) and a plurality of electronic control units (ECUs) 10a, 10b, 10c (referred to interchangeably as the ECUs 10a-10c and the ECUs 10) communicatively connected to each other via a communication bus 100.

The vehicle-mounted network system 1 is configured such that the plurality of ECUs transmit and receive control messages via the communication bus 100 to communicate with each other and thereby share detection values on vehicle states and commands to vehicle-mounted devices to be controlled, which provides control of the subject vehicle. A communication protocol, such as the well-known control area network (CAN) or local interconnect network (LIN) protocol or the like, may be applied to communications on the communication bus 100 in the vehicle-mounted network system 1. Besides the plurality of ECUs 10 and the management ECU 20, various electrical components (not shown), such as vehicle-mounted devices, sensors, and switches, may be connected to the communication bus 100.

The plurality of ECUs may be roughly classified into a plurality of groups, that is, a group of body system ECUs, a group of control system ECUs, and a group of information system ECUs. Each of the plurality of groups of ECUs may include a plurality of ECUs. Each of the plurality of ECUs 10 is build around a well-known microcomputer including a controller 11 (as a mode-of-operation control unit) and a transceiver 12. The controller 11 includes CPU, ROM, RAM, IO-ports, and a communication controller and others. The controller 11 is configured to execute programs stored in the ROM or the like to generate commands to operate vehicle-mounted devices to be controlled and control messages for the other ECUs. The transceiver 12 is a communication unit configured to decode signals on the communication bus 100 and forward the decoded signals to the controller 11 and encode transmission data produced in the controller 11 and forward the encoded data to the communication bus 100.

Vehicle-mounted network system 1 includes a network management function supporting the partial networking. More specifically, for each of the plurality of ECUs 10, on receipt of a sleep signal directed to the ECU via its transceiver 12 from the communication bus 100, the ECU disables some of functions other than the transceiver 12 and transitions to the low power consumption state, i.e., the sleep mode. The transceiver 12 of the ECU 10 in the sleep mode remains operating so as to receive an activation signal directed to the ECU 10. Once the ECU 10 in the sleep mode receives the activation signal directed thereto from the communication bus 100 via its transceiver 12, the ECU 10 restores the disabled functions to thereby transition to the normal mode of operation. Each of the ECUs 10 forwards the activation signal to the communication bus 100 via its controller 11 as required, which allows another ECU 10 in the sleep mode to return to the normal mode.

The management ECU 20 includes a power supply relay 21 and a control microcomputer 23, and is configured to control powering each of the ECUs 10 on/off and putting each of the ECUs 10 in the sleep mode. The power supply relay 21 is configured to control the powering each of the ECUs 10 on/off under control of the control microcomputer 23.

Referring to FIG. 1A, the ECUs 10a-10c are supplied with power from respective ones of a plurality of branch power delivery paths branched from the power delivery path 200. The power supply relay 21 includes a plurality of switches 22 provided along the respective branch power delivery paths. The plurality of switches 22 may individually be turned on and off. Each of the switches 22 includes, but is not limited to, a mechanical relay that is electromagnetically opened and closed or a semiconductor relay or the like.

Opening and closing each of the switches 22 of the power supply relay 21 are controlled by the control microcomputer 23. Each of the ECUs 10, including the controller 11 and the transceiver 12, is disabled by the control microcomputer 23 opening or turning off the corresponding switch 22 of the power supply relay 21 to power off the ECU 10, which can provide no power consumption of the ECU 10. The disabled ECU 10 may be restarted by the control microcomputer 23 closing or turning on again the corresponding switch 22 that is open to power on the ECU 10.

The control microcomputer 23 is built around a well-known microcomputer including CPU, ROM, RAM, IO-ports, a communication controller and others. The control microcomputer 23 is configured to power each of the ECUs 10 on/off and put each of the ECUs 10 in the sleep mode according to programs and data stored in the ROM or the like.

Figure 1B:
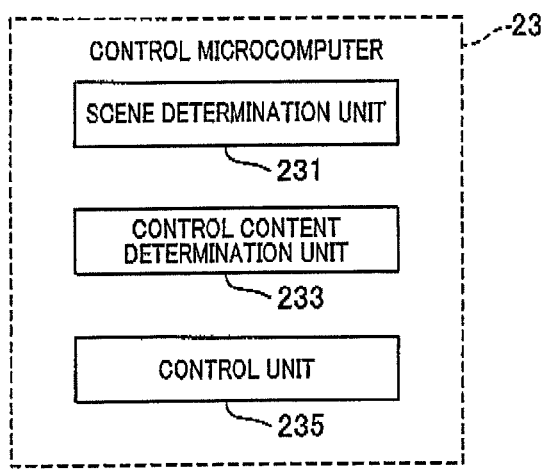
FIG. 1B is a schematic block diagram of a control microcomputer of FIG. 1A.

The control microcomputer 23 includes, as shown in FIG. 1B, a scene determination unit 231 configured to acquire information indicative of a vehicle situation and determine a scene from the acquired information, a control content determination unit 233 configured to determine control contents for powering on or off at least one specific ECU, of the plurality of ECUs 10, corresponding to the scene determined by the scene determination unit, if any; and a control unit 235 configured to power on or off the at least one specific ECU 10 by using the power supply relay 21 based on the control contents determined by the control content determination unit.

Figure 2:
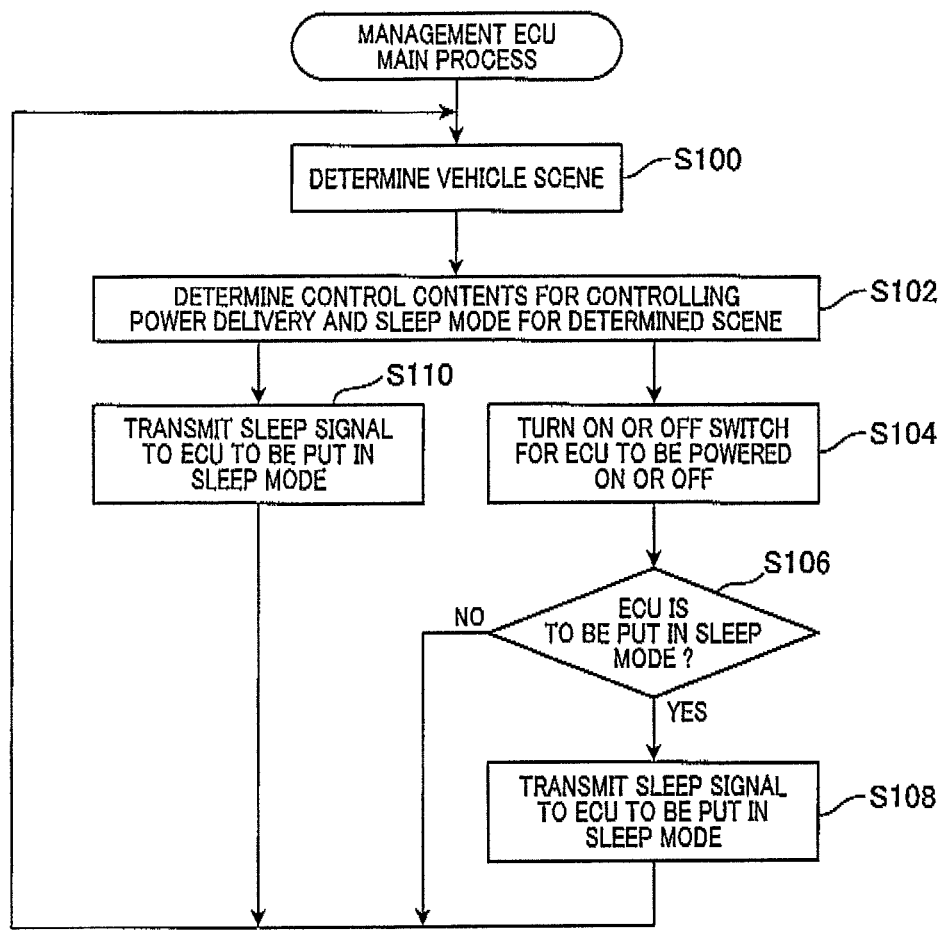
FIG. 2 is a flowchart of a main process performed in a management electronic control unit (ECU) of FIG. 1A.

The scene determination unit 231 is responsible for executing the operation in step S100 (see the flowchart of FIG. 2). The control content determination unit 233 is responsible for executing the operation in step S102 (see the flowchart of FIG. 2). The control unit 235 is responsible for executing the operations in steps S104, S110, S108 (see the flowchart of FIG. 2). The above operations will be explained later in more detail.

The control microcomputer 23 stores definition information that defines conditions for specifying scenes based on vehicle situations. Examples of the vehicle scenes include, but are not limited to, a scene that an occupant (nor no occupant) is present in the vehicle, a scene that a front passenger seat is (or is not) occupied, a scene that a rear seat is (or is not) occupied, a scene that a vehicle speed is equal to or greater than a predetermined upper limit, a scene that a shift lever is at a position other than a reverse position, a scene that the shift lever is at a parking position and the vehicle speed is zero, a scene that the shift lever is at a drive position, a scene that the shift lever is at the drive position and the vehicle speed is equal to or less than a predetermined lower limit, a scene that an engine switch is on and a low-beam mode of headlights is off, and a scene that an ambient temperature is equal to or greater than a predetermined lower limit (or equal to or less than a predetermined upper limit).

The control microcomputer 23 further stores, for each of the ECUs 10, definition information that defines control contents for power delivery and the sleep mode for each of the vehicle scenes. Control contents for each of the ECUs 10 that are unlikely to be used in a specific vehicle scene and control only units which don't have to stand by to immediately return to the normal mode of operation as required may be defined such that the ECU 10 is powered off. It takes a certain amount of time for such powered-off ECUs to return to the normal mode of operation from when being powered on again. Therefore, control contents for each of the ECUs 10 that have to return to the normal mode of operation immediately depending upon situations may be defined such that the ECU 10 is put in the sleep mode without being powered off.

A few examples of control contents for the vehicle scenes may be as follows. For example, in the scene that no occupant is present within the vehicle, the ECUs 10 that control units, such as a sliding roof, power seats, power windows, an audio system, an air conditioner or the like may be powered off. In the scene that an occupant is present within the vehicle, the ECUs 10 that have been powered off due to the absence of occupants in the vehicle may be powered on and then the powered-on ECUs 10 may be put in the normal mode of operation or in the sleep mode. For example, the ECUs 10 that control units, such as the sliding roof, the power seats, the power windows, the audio system, the air conditioner and the like, may be put in the sleep mode after being powered on, and may be left in the sleep mode until the units are operated. Which control content to be used in which scene is a design consideration. Therefore, the scenes and the control contents are not limited to the specific scenes and the specific control contents set forth above. Other scenes and other control contents may be applied to the present invention.

[Process Performed in the Management ECU 20]

There will now be explained a main process performed in the control microcomputer 23 of the management ECU 20 with reference to a flowchart of FIG. 2.

In step S100, the control microcomputer 23 determines a vehicle scene corresponding to the current vehicle situation on the basis of data acquired from the ECUs 10, various vehicle-mounted devices, sensors, switches and others, where the control microcomputer 23 acquires output data from the ECUs 10, various vehicle-mounted devices, sensors, switches and others via the communication bus 100. Alternatively, the control microcomputer 23 may acquire output data from vehicle-mounted devices and sensors (not shown) directly connected to the management ECU 20 or sensors (not shown) incorporated in the management ECU 20. The control microcomputer 23 determines the vehicle scene corresponding to the current vehicle situation based on the acquired output data and the definition information for specifying the vehicle scenes.

In step S102, the control microcomputer 23 determines, for each of the ECUs 10, control contents corresponding to the current vehicle scene determined in step S100 based on the definition information. In the present embodiment, the control microcomputer 23 determines, depending on the determined current vehicle scene, which ECU 10 to be powered on or off and which ECU 10 to be put in the sleep mode. The control microcomputer 23 further determines whether or not the ECU 10 determined that it should be powered on to be put in the sleep mode after activation.

The control microcomputer 23 performs the following steps S104-S108 for the ECU 10 determined that it should be powered on or off in step S102. In step S104, the control microcomputer 23 powers off the ECU 10 that is on and determined that it should be powered off in step S102 by turning off one of the switches of the power supply relay 21 corresponding to the ECU 10 to be powered off, or the control microcomputer 23 powers on the ECU 10 that is off and determined that it should be powered on in step S102 by turning on one of the switches of the power supply relay 21 corresponding to the ECU 10 to be powered on. In the latter, the powered-on ECU 10 will operate in the normal mode of operation after being initialized in a predetermined manner upon activation of the powered-on ECU 10.

In step S106, the control microcomputer 23 branches based on whether or not the ECU 10 powered on in step S104 is to be put in the sleep mode. If it is determined that the powered-on ECU 10 should be put in the sleep mode, then the control microcomputer 23 proceeds to step S108. In step S108, the control microcomputer 23 transmits the sleep signal directed to the ECU 10 required to be put in the sleep mode to the communication bus 100, and thereafter returns to step S100. If it is determined in step S106 that the powered-on ECU 10 should not be put in the sleep mode, then the control microcomputer 23 returns to step S100.

The control microcomputer 23 performs the subsequent step S110 for the ECU 10 determined that it should be put in the sleep mode in step S102. In step S110, the control microcomputer 23 transmits the sleep signal directed to the ECU 10 required to be put in the sleep mode to the communication bus 100, and then returns to step S100.

[Processes Performed in Each ECU 10]

Figure 3A:
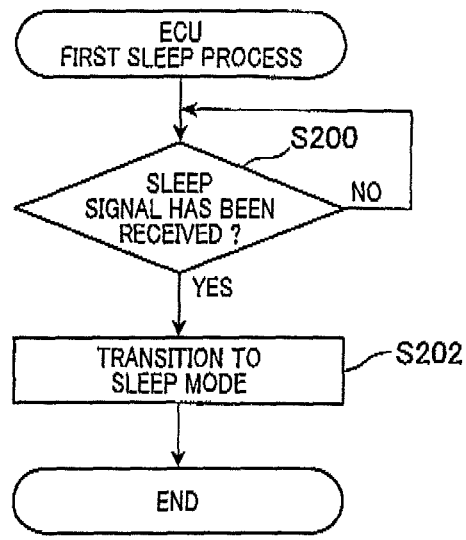
FIG. 3A is a flowchart of a first sleep process.

There will now be explained a flowchart of a first sleep process performed in the controller 11 of each of the ECUs 10, corresponding to the main process (see FIG. 2) performed in the management ECU 20, with reference to a flowchart of FIG. 3A.

In step S200, the controller 11 of each of the ECUs 10 determines whether or not the sleep signal directed to the ECU 10 has been received. If it is determined in step S200 that the sleep signal directed to the ECU 10 has not been received yet, then the controller 11 repeats step S200. If it is determined in step S200 that the sleep signal directed to the ECU 10 has been received from the management ECU 20, then the controller 11 proceeds to step S202, where the controller 11 disables predetermined functions to transition to the sleep mode, that is, the low power consumption state. The first sleep process then ends.

[Advantages]

The vehicle-mounted network system 1 of the present embodiment can provide the following advantages. The management ECU 20 determines, for each of the ECUs 10, whether or not the ECU 10 needs to be supplied with power and whether or not the ECU 10 is allowed to transition to the sleep mode based on the scene specified as a function of the vehicle situation and then powers on/off the ECU 10 and/or causes the ECU 10 to transition to the sleep mode.

Powering off the ECUs 10 that are not used in a specific scene can eliminate power consumption of these ECUs 10. This can reduce standby power of the ECUs 10 that are not involved in controlling the devices used in the scene, thereby reducing power consumption of the whole system. The powered-off ECUs 10 are allowed to be powered on in such a scene that the powered-off ECUs need to be activated, which allows all the ECUs that need to be involved in controlling the devices used in the scene to operate, thereby maintaining functionality of the system.

As above, the ECUs 10 that are not used at all in controlling the devices used in a specific scene are configured to be powered off. The ECUs 10 that have to return to the normal mode of operation immediately in another specific scene may be left in the sleep mode without being powered off. With this configuration, use of the power delivery control and the sleep mode in the partial networking allows enhancing power savings and maintaining functionality to be compatible with each other.

[Modifications]

Figure 3B:
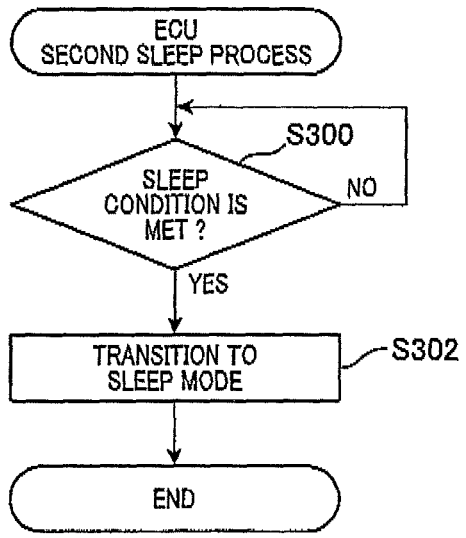
FIG. 3B is a flowchart of a second sleep process.

In the above described embodiment, the management ECU 20 is configured to control powering on/off each of the ECUs 10 and transitioning of each of the ECUs 10 to the sleep mode. Alternatively, each of the ECUs 10 may be configured to autonomously transition to the sleep mode based on detection values on vehicle states and operational conditions of the other ECUs 10. In such a configuration, the controller 11 of each of the ECUs 10 is configured to perform a second sleep process as shown in FIG. 3B. It may be assumed that the controller 11 of each of the ECUs 10 prestores information that defines conditions (hereinafter referred to as sleep conditions) which allow the ECU 10 to transition to the sleep mode.

As shown in FIG. 3B, in step S300, the controller 11 of each of the ECUs 10 determines, based on data acquired from the communication bus 100, whether or not the sleep condition is met, where the controller 11 acquires output data of devices involved in the sleep condition via the communication bus 100. Based on the acquired output data and the information for defining the sleep condition, the ECU 10 determines whether or not the ECU 10 is allowed to transition to the sleep mode. The devices involved in the sleep condition refers to devices such that, when these devices are in operation, the ECU 10 is allowed to transition to the sleep mode.

If it is determined in step S300 that the sleep condition is not met, the controller 11 repeats the operation in step S300. If it is determined in step S300 that the sleep condition is met, then the controller 11 proceeds to step S302, where the controller 11 disables predetermined functions to enter the sleep mode, that is, the low power consumption state. Thereafter, the process ends.

When each of the ECUs 10 includes the above function of autonomously transitioning to the sleep mode, the management ECU 20 neither has to determine control contents related to the sleep mode nor performs step S101 in the main process as shown in FIG. 2.

In the embodiments set forth above, the plurality of switches 22 in the power supply relay 21 are electrically connected to the respective ECUs 10, one for each ECU 10. Alternatively, for example, a plurality of ECUs 10 to be powered on/off simultaneously for the same scene or scenes may be electrically connected to one of the switches 22.

In the embodiments set forth above, the power supply relay and the control microcomputer 23 are included in the management ECU 20 configured as a single unit. Alternatively, the power supply relay 21 and the control microcomputer 23 may be configured as separate units.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A vehicle-mounted network system comprising:
a plurality of electronic control units (ECUs) communicatively connected to a communication path of a vehicle-mounted network, each of the ECUs being configured to selectively perform a normal mode of operation, in which the functionality of the ECU is not restricted, and a sleep mode, in which the functionality of the ECU is restricted; and
a management apparatus communicatively connected to the communication path,
wherein the management apparatus comprises:
a power supply relay including a plurality of switches provided along a plurality of power delivery paths, one for each of the plurality of power delivery paths, each of the power delivery paths being connected to at least one of the plurality of ECUs through a corresponding one of the switches, whereby the at least one ECU can be powered on and off by turning on and off the corresponding switch;
a scene determination unit configured to acquire information indicative of a vehicle situation and determine a scene from the acquired information;
a control content determination unit configured to determine control contents for powering on or off at least one specific ECU, of the plurality of ECUs, corresponding to the scene determined by the scene determination unit, if any; and
a control unit configured to power on or off the at least one specific ECU by using the power supply relay based on the control contents determined by the control content determination unit.

2. The vehicle-mounted network system of claim 1, wherein the control content determination unit is further configured to select at least either one of the control content for powering on or off the at least one specific ECU and the control content for causing the at least one specific ECU to transition to the sleep mode,
the control unit is further configured to power on or off the at least one specific ECU or transmit a sleep signal to the communication path for causing the at least one specific ECU to transition to the sleep mode according to the control content selected by the control content determination unit, and
each of the ECUs is configured to, during the normal mode of operation, transition from the normal mode of operation to the sleep mode upon receipt of the sleep signal from the management apparatus.

3. The vehicle-mounted network system of claim 1, wherein each of the plurality of ECUs comprises a mode-of-operation control unit configured to acquire information about a condition for transitioning to the sleep mode via the communication path, and conduct the transitioning from the normal mode of operation to the sleep mode according to the acquired information.

4. A management apparatus for managing operating states of a plurality of electronic control units (ECUs) communicatively connected to a communication path of a vehicle-mounted network, each of the ECUs being configured to selectively perform a normal mode of operation, in which the functionality of the ECU is not restricted, and a sleep mode, in which the functionality of the ECU is restricted, the management apparatus comprising:
a power supply relay including a plurality of switches provided along a plurality of power delivery paths, one for each of the plurality of power delivery paths, each of the power delivery paths being connected to at least one of the plurality of ECUs through a corresponding one of the switches, whereby the at least one ECU can be powered on and off by turning on and off the corresponding switch;
a scene determination unit configured to acquire information indicative of a vehicle situation and determine a scene from the acquired information;
a control content determination unit configured to determine control contents for powering on or off at least one specific ECU of the plurality of ECUs, corresponding to the scene determined by the scene determination unit, if any; and
a control unit configured to power on and off the at least one specific ECU by using the power supply relay based on the control contents determined by the control content determination unit.

5. The management apparatus of claim 4, wherein
the control content determination unit is further configured to select at least either one of the control content for powering on or off the at least one specific ECU and the control content for causing the at least one specific ECU to transition to the sleep mode,
the control unit is further configured to power on or off the at least one specific ECU or transmit a sleep signal to the communication path for causing the at least one specific ECU to transition to the sleep mode according to the control content selected by the control content determination unit, and each of the ECUs is configured to, during the normal mode of operation, transition from the normal mode of operation to the sleep mode upon receipt of the sleep signal from the management apparatus.

* * * * *